United States Patent [19]

Takahashi et al.

[11] Patent Number: 4,930,122
[45] Date of Patent: May 29, 1990

[54] MESSAGE TRANSFER SYSTEM AND METHOD

[75] Inventors: Yasuhiro Takahashi, Fujisawa; Osamu Takada, Ebina, both of Japan

[73] Assignee: Hitachi, Ltd., Tokyo, Japan

[21] Appl. No.: 150,171

[22] Filed: Jan. 29, 1988

[30] Foreign Application Priority Data

Mar. 9, 1987 [JP] Japan .................................. 62-53808

[51] Int. Cl.⁵ .............................................. H04J 3/00
[52] U.S. Cl. ................................. 370/85.15; 370/94.1
[58] Field of Search ..................... 370/60, 94, 85, 86, 370/88, 89, 85.15, 85.12, 94.1; 340/825.05, 825.5

[56] References Cited

U.S. PATENT DOCUMENTS

| | | | |
|---|---|---|---|
| 4,665,514 | 5/1967 | Ching et al. | 370/94 |
| 4,736,370 | 4/1988 | Hirome et al. | 370/94 |
| 4,755,986 | 7/1988 | Hirata | 370/94 |

OTHER PUBLICATIONS

"Data Transmission", (Nippon Telegraph and Telephone Corporation), pp. 354–367.
"Packet Switching Technology and Application", (pp. 88–92, (1982), edited by the Japan Institute of Electronics, Information and Communication Engineers.

*Primary Examiner*—Joseph A. Orsino
*Assistant Examiner*—Frank M. Scutch, III
*Attorney, Agent, or Firm*—Pennie & Edmonds

[57] ABSTRACT

Messages are transferred among a plurality of nodes by segmenting each of the messages into a plurality of packets on a transmission loop, and a receiver circuit which reassembles the segmented packets into the original message by the use of message buffers is comprised in each of the nodes, to detect whether or not a packet having arrived is from a registered mate, so that when the mate of the packet is not registered, the packet having arrived is registered anew in an empty field in any of the message buffers, thereby to perform message buffering, and that when no empty field exists, the packet having arrived is returned as being unreceivable, whereupon the sending mate having received the packet resends it.

8 Claims, 6 Drawing Sheets

MESSAGE TRANSFER SYSTEM AND METHOD

BACKGROUND OF THE INVENTION

1. Field of the Invention

The present invention relates to a message transfer system and method. More particularly, it relates, in a system wherein a message longer than a packet length is segmented and sent, and the message is reassembled on a receiving side, thereby to transfer the message, to a transfer system and method well suited to communication facilities which simply control communications with the smallest buffer capacity corresponding to a message processing ability.

2. Description of the Prior Art

Heretofore, some of network systems etc. based on loop transmission have adopted a message transfer method wherein a message longer than a packet length is segmented and sent from a node, and the message is reassembled on a receiving side, thereby to transfer the message. For the purpose of making it possible to receive packets from all nodes and to reassemble messages, this method has employed a scheme in which message buffers for individual senders are prepared in correspondence with the maximum node number and are installed in each of the nodes.

As examples of pertinent literatures, there are mentioned "DATA TRANSMISSION" (Nippon telegraph and Telephone corporation), p. 354–p. 367, and "PACKET SWITCHING TECHNOLOGY AND ITS APPLICATION" (p. 88–p. 92, 1982) edited by the Japan Institute of Electronics, Information and Communication Engineers.

With the prior art, since nodes having acquired fields send packets without any limitation, packets from different nodes coexistingly arrive at a certain node in some cases. On the receiving side, therefore, the buffers for gathering the packets and reassembling messages for the individual sender nodes need to be prepared in the largest number (usually, 32–128) of nodes connected to a loop. The rate of concentration of messages per node, however, is not always equally high for all the nodes though it depends also upon the way of application of the message transfer system. In a case where the rates of concentration are somewhat nonuniform, the rates of usage of most buffers will become much lower than the rate of usage of a buffer for a specified node, and the number of buffers simultaneously used will become small as compared with the total number of the nodes. Accordingly, the prior art has the problem of wastefulness in that the large quantities of buffers must be prepared irrespective of the utilization factors of the buffers and the number of the buffers simultaneously required.

SUMMARY OF THE INVENTION

An object of the present invention is to solve such a problem of the prior art and to provide a message transfer system and method which can maintain communications with the required minimum number of buffers installed on each node. To this end, the present invention consists in a message transfer system wherein messages are transferred among a plurality of nodes by segmenting each of the messages into a plurality of packets on a transmission loop, characterized in that each of at least two nodes constituting the system functions to perform message buffering for registering packets in correspondence with addresses of the mate nodes from which messages are to be received, to reassemble an original message from received packets, to detect whether or not packets having arrived are registered, to discriminate whether or not the packets having arrived are to be received, and to permit the reception and reassembly of only the packets from the mate nodes limited by the detection means as well as the discrimination means.

DETAILED DESCRIPTION OF THE PREFERRED EMBODIMENTS

In the present invention, the number of message buffers to be prepared is calculated from the rates of concentration of messages on nodes lying on a transmission loop, the numbers of messages to be simultaneously processed by devices which are connected to the nodes to actually process the messages, etc., the buffers in that number are disposed, and they are dynamically allotted and shared with a unit being a time till message assembly completion, whereby a buffer capacity can be curtailed.

More specifically, the head packet of a message segmented and sent is received, the sender address thereof is registered in the register of an empty buffer, and the data of the packet is written into the buffer. Thenceforth, the data items of packets from the same sender are written into the buffer. When, after receiving the tail packet of the message, the buffer has completed such a process as delivering the message to a host computer, it clears the register so as to be capable of receiving a message from another node. These processes are performed every buffer, so that messages from mates in the number of buffers can be received at one time.

The foregoing and other objects, advantages, manner of operation and novel features of the present invention will be understood from the following detailed description when read in connection with the accompanying drawings.

Figure 3:
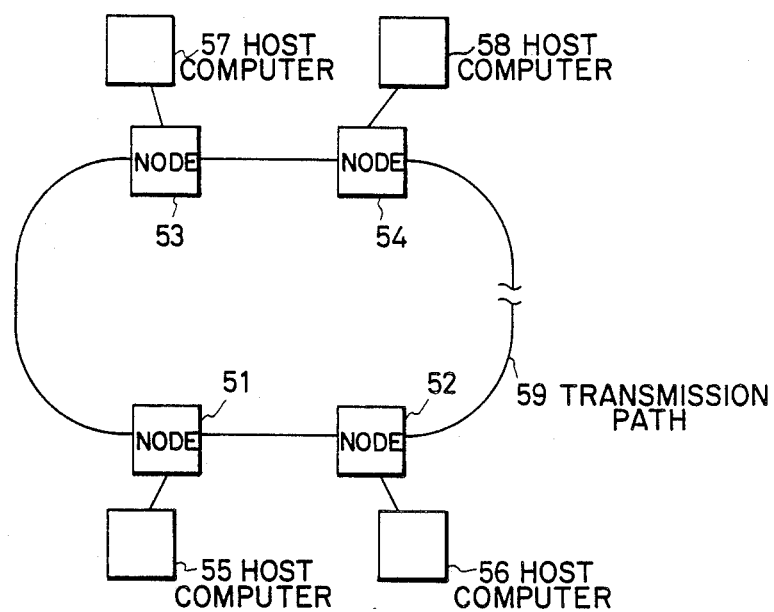
FIG. 3 is a system architecture diagram of a network to which the present invention is applied.

FIG. 3 is an architectural diagram of a network system based on a loop transmission method to which the present invention is applied.

Shown in FIG. 3 is the network system in which respective nodes 51, 52, 53 and 54 are coupled on a loop by a transmission path 59 and have host computers 55, 56, 57 and 58 connected thereto so as to perform data communications among the computers. In the system, the present invention is applied to a control circuit within each node. The computers communicate with one another through the transfer of messages having desired lengths. On the network, however, each of the messages of the desired lengths is segmented into data items of certain fixed length and is endowed with the information items of a destination, a sender, etc., to be changed into the form of packets, with which the communications among the nodes are realized. That is, a message from the computer of a sender is transformed into a plurality of packets by the node to which the computer is connected, and the packets are transmitted on the transmission loop and are reassembled into the original message by the mate side node, so that the packets reach the computer of a destination again in the form of the message.

Frames for carrying the packets are revolving on the transmission loop 59 at a fixed cycle.

Figure 4:
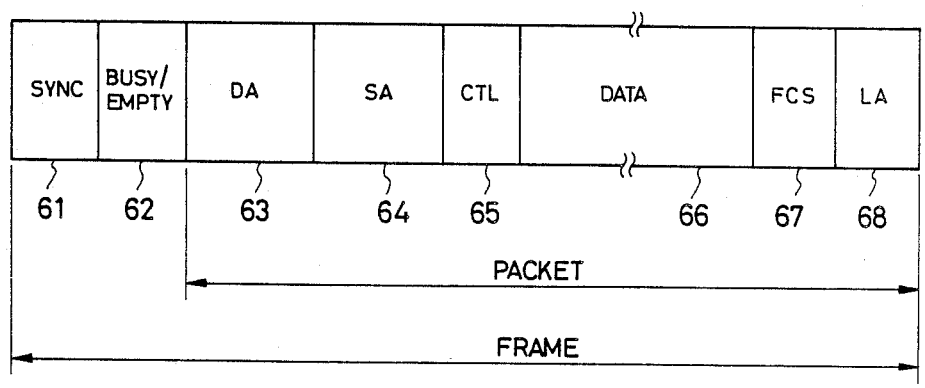
FIG. 4 is a frame format diagram.

FIG. 4 is a diagram showing a format within the frame.

Referring to FIG. 4, numeral 61 designates a synchronous pattern for synchronizing the nodes. Numeral 62 designates busy/empty information which indicates whether what is collectively called a "packet field," namely, a field for carrying the packet composed of individual fields 63, 64, 65, 66, 67 and 68 are empty or busy. A destination address enters the field 63, and a sender address enter the field 64. Control information in the field 65 serves for the indication of the last packet in the case where one message has been decomposed into a plurality of packets, the indication of an effective data length in the data field 66 for expressing a fraction arising when a message of any desired length has been segmented with a fixed length, or the like. Data segmented for forming the packet enters the data field 66. The field 67 contains frame check sequence information for an error control. The loop answer field 68 serves to send a reception situation on a receiving side back to a sender. The data field 66 is of fixed length.

Figure 5:
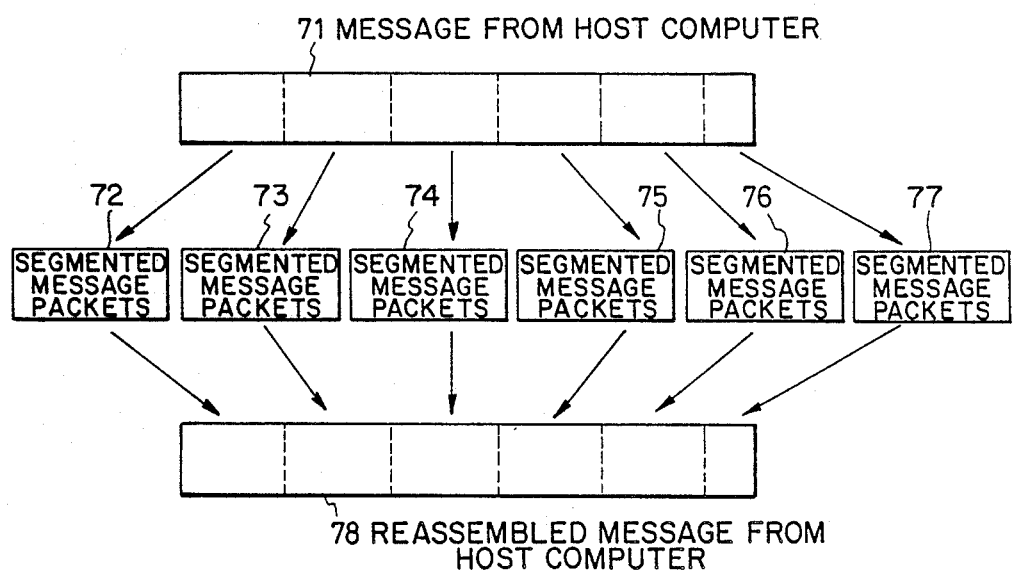
FIG. 5 is a diagram for explaining the segmenting/reassembly of a message.
Figure 6:
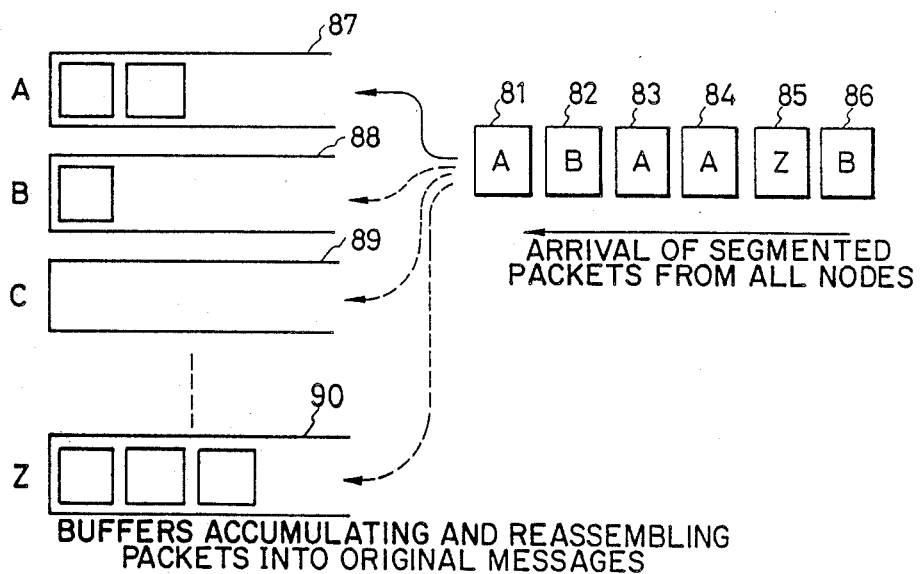
FIG. 6 is a diagram for explaining the reassembly of a message from coexistent packets.

FIG. 5 is a diagram for explaining the segmenting-/reassembly of a message, while FIG. 6 is a diagram for explaining the reassembly of a message from packets existing mixedly.

As shown in FIG. 5, in a case where a message 71 to be sent from the host computer is longer than the data length (the size of the field 66) set by the packet field within the frame in FIG. 4, it must be segmented and sent so as to conform to the data field length of the data field 66 shown in FIG. 4, as indicated at numerals 72, 73, 74, 75, 76 and 77. On the receiving side, these segments need to be assembled back into the original message as indicated at numeral 78.

As shown in FIG. 6, the segmented packets arrive while coexisting with packets from the other nodes. For this reason, buffers for accumulating the packets from the individual nodes and reassembling them into the original messages have been required in the total number of the nodes in the prior-art system. However, the packets are not always sent uniformly from all the nodes. In a case where the packets of the nodes from specified mates are comparatively large in number, or in a case where the rate of communications is not very high, the buffers prepared in the number of all the nodes are hardly used and are wasteful.

In the present invention, therefore, each node is furnished with a receive mate limiting function (the details of which will be described later with reference to FIG. 1) and a retry sending function (the details of which will be described with reference to FIG. 2), whereby messages are transferred with the required minimum buffer capacity.

Figure 7:
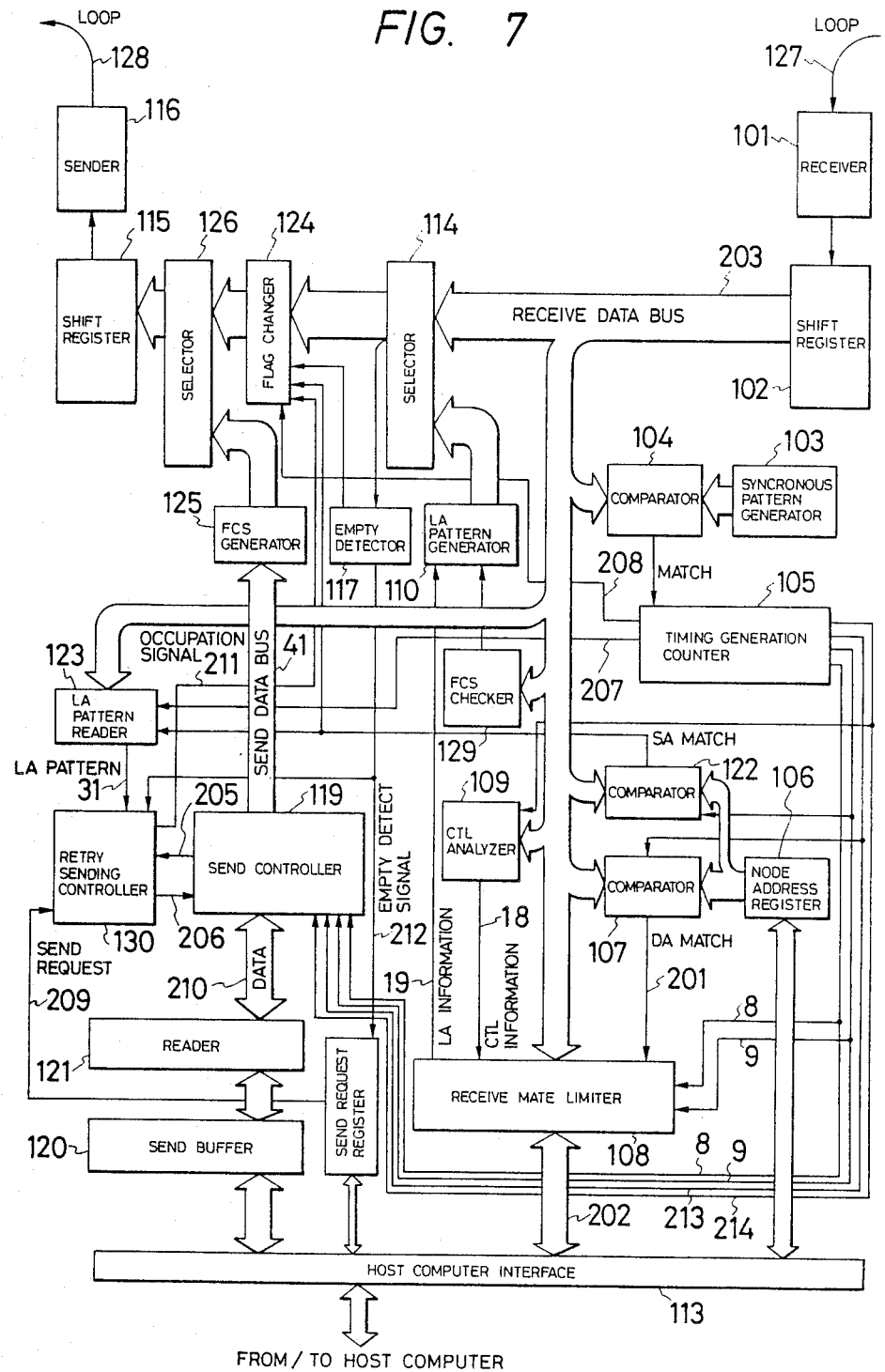
FIG. 7 is a block diagram of the interior of a node to which the present invention is applied.

A detailed block diagram of the node shown in FIG. 3 is depicted in FIG. 7. In this node, it is a receive mate limiter in FIG. 1 that receives packets from the transmission loop and realizes the above operation. On the other hand, it is a retry sending controller shown in FIG. 2 that governs the sending of the packets, especially the retry sending operation. The whole flow shall be stated later, and the central operations of the present invention will be explained here.

Figure 1:
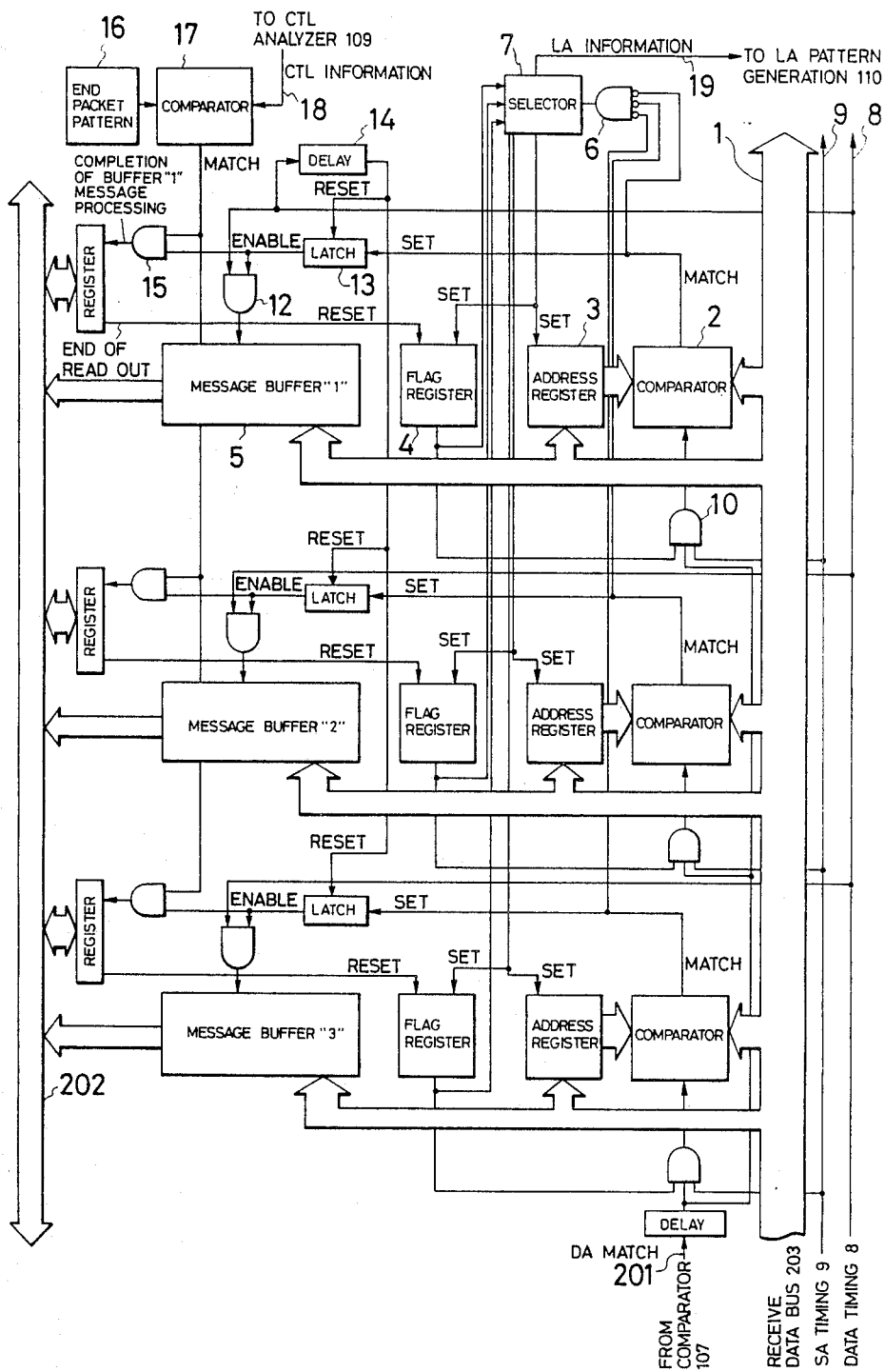
FIG. 1 is a block diagram of a receive mate limiter showing an embodiment of the present invention.

FIG. 1 is a detailed block diagram of the receive mate limiter showing an embodiment of the present invention. It illustrates an example in which the receive mate limiting function mentioned above is realized by circuitry.

Referring to FIG. 1, numeral 1 designates a receive data bus being a signal line on which packets having arrived are paralleled in byte unit and flow in succession, numeral 2 an address comparator which serves to judge if the packet having arrived is from a registered mate, numeral 3 an address register which stores the address of a mate in order to register the mate as the receive mate, numeral 4 a flag register which indicates either that the receive mate is registered with a message buffer being in a reservation state or that the receive mate is not registered yet with the message buffer being in an empty state, numeral 5 the message buffer which stores the data (66 in FIG. 4) of the received packet so as to reassemble the original message, numeral 6 a gate which serves to indicate that the sender of the packet having arrived is not registered as the mate in any of the buffers, numeral 7 a selector which selects an empty one of the buffers when the packet not registered has arrived, numeral 8 a data timing signal which indicates that the data part of the packet is passing on the receive data bus 1, numeral 9 an SA timing signal which indicates that the sender address (SA) part of the packet is passing on the receive data bus 1, numeral 10 a timing gate which serves to actuate the comparator 2, numeral 12 a gate for a write signal into the message buffer, numeral 13 a latch which holds it till the end of data write into the buffer that the addresses have matched, numeral 14 a delay circuit which produces a timing for resetting the latch 13 after the turn-off of the data timing signal 8, numeral 15 a gate which indicates the completion of the message reception, numeral 16 an end packet pattern which has the same value as a value indicated in the control information (CTL) part of the last packet of the segmented message, numeral 17 a comparator for the control information, numeral 18 the value of the control information (CTL) of the packet having arrived, and numeral 19 a packet answer, namely, the loop answer (LA) value which is returned with respect to the packet having arrived.

Figure 2:
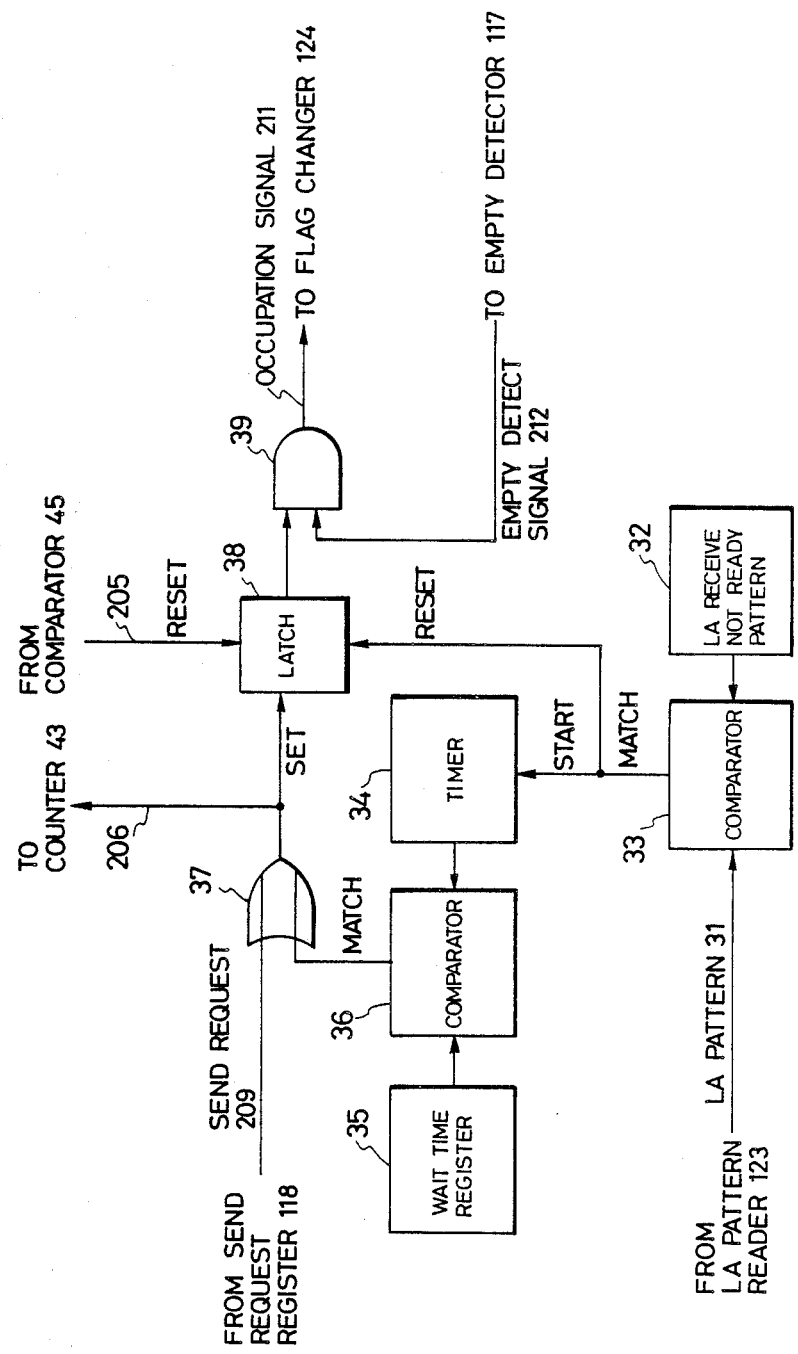
FIG. 2 is a block diagram of a send controller showing another embodiment of the present invention.

FIG. 2 is a detailed block diagram of the retry sending controller showing another embodiment of the present invention. This embodiment realizes the aforementioned retry sending function in the form of circuitry.

Figure 8:
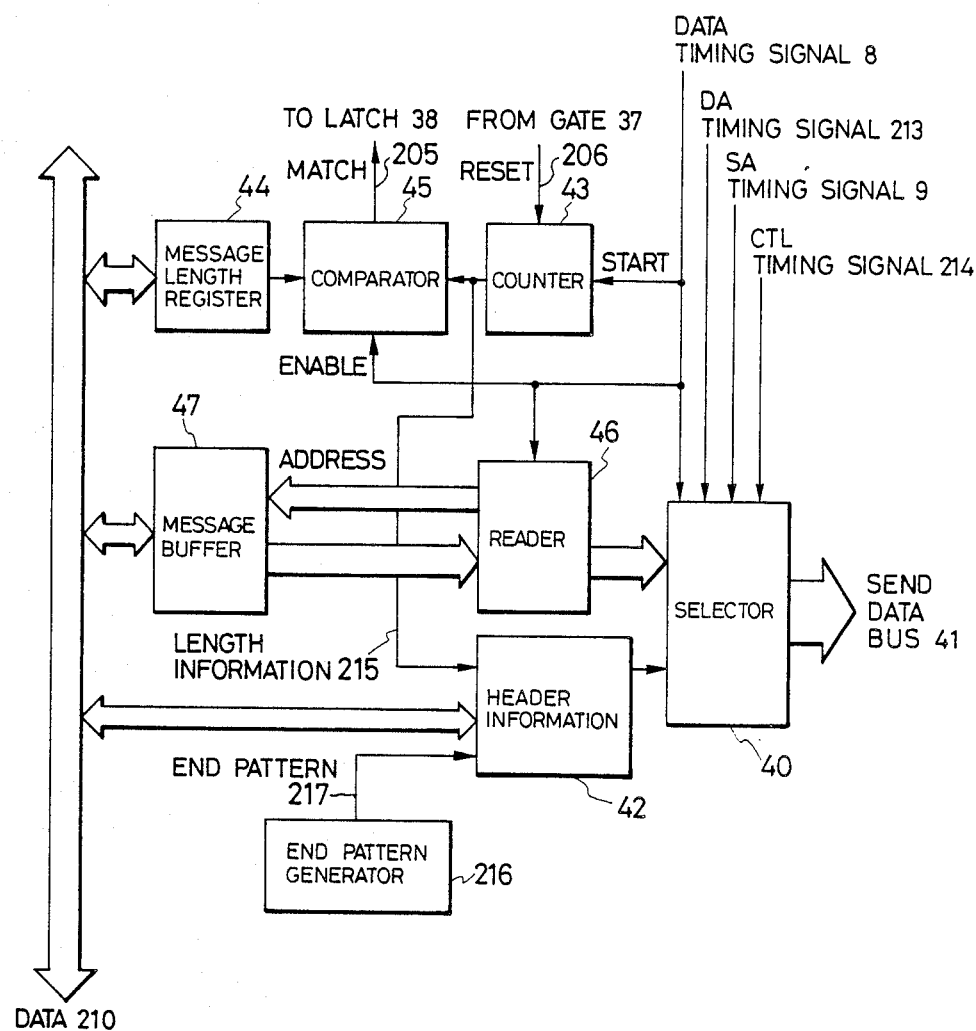
FIG. 8 is a block diagram of a send controller in FIG. 7.

Referring to FIG. 2, numeral 31 denotes the loop answer information (LA) from the destination of the first one of a plurality of packets into which a message has been segmented, numeral 32 an LA receive "not ready" pattern which has the same value as the loop answer information to be returned when the destination node is in an unreceivable state, numeral 33 a comparator which serves to know whether or not the loop answer indicates that the reception is not ready, numeral 34 a timer which is started by a match signal from the comparator 33, numeral 35 a wait time register in which a wait time till the start of retry sending is set beforehand, numeral 36 a comparator which decides if the timer 34 has reached the preset wait time, numeral 37 a gate which serves to convey a send request from the host computer or a retry sending request from the comparator 36, numeral 38 a latch which indicates the send request state, and numeral 39 a gate which serves to deliver a signal for occupying an empty field. In addition, FIG. 8 shows a send controlling circuit in the prior art. Since this circuit is combined with the retry sending circuit in FIG. 2, it will now be explained. Referring to FIG. 8, numeral 40 denotes a selector for selecting data to be delivered to a send data bus in accordance with any of various timing signals, numeral 41 the send data bus for sending the packet, numeral 42 a header information producing circuit which serves to put the destination address, the sender address and an end packet pattern 217 on the packet when the segmented packet is to be sent, numeral 216 an end packet pattern generator, numeral 43 a counter for counting the length of data having been delivered at present, numeral 44 a message length register for storing the length of the message to be sent, numeral 45 a comparator which decides whether or not the message to be sent has been entirely delivered, numeral 46 a reader circuit for fetching data to-be-delivered from a message buffer, and numeral 47 the message buffer for storing the message to be delivered.

Now, the operations of the receive mate limiter and the retry sending controller will be described with reference to FIGS. 1, 2 and 8.

When a packet passes through the node shown in FIG. 3, it is sectioned in byte unit and appears on the receive data bus 1. Regarding a packet to the own node, therefore, the sender address (SA) is checked, and if any packet from the mate of the sender address has already been received is decided by comparing the content of the address register 3 and the sender address on the receive data bus 1 by means of the comparator 2. In a case where no packet has been received, the empty message buffer 5 to receive the packet is selected by the selector 7, to register the sender address on the receive data bus 1 in the address register 3 of the message buffer and to set busy/empty indicating flag register 4 thereof. Thenceforth, data is gathered in the message buffer 5 at the data timing.

When the second packet from the same node arrives, the address thereof has already been registered in the address register 3, and hence, only the data part of the packet is gathered in the message buffer 5.

In a case where a packet from another node has arrived, it is received by any of the buffers matching in address. In a case where no buffer matches in address, but where the flag register 4 of any of the buffers indicates empty, the address of the packet is registered in the corresponding address register 3, and the data thereof is gathered.

In a case where no buffer matches in address and where the flag registers 4 of all the buffers indicate the busy states, the selector 7 provides loop answer information (LA information) and gives the sender a reply to the effect that the reception of the sent packet is not ready.

In case of the arrival of a packet which is sent from a sender registered in the address register 3 and the control information (CTL information) 18 of which indicates an end pattern, that is, the last packet of a message, the host computer connected to the node is informed of the fact that the reception of the message by the buffer concerned has been completed. When the host computer has read out the message in the buffer, to indicate the end of buffer readout, the buffer has its flag register 4 reset and becomes capable of receiving another message.

On the other hand, in the sender to which the reply to the effect that the reception is not ready has been returned, retry sending is performed after a certain time by the retry sending controller shown in FIG. 2. More specifically, when the returned loop answer value (LA value) 31 and the LA receive not-ready pattern 32 compared by the comparator 33 match, the timer 34 is started, and it is waited that the content of the timer is found by the comparator 36 to match with a time previously set in the wait time register 35. After the lapse of the preset time, the retry sending controller operates as if the send request from the host computer were made, and the latch 38 is set by the gate 37, whereby the action of field occupation is started. Subsequently, the counter 43 of the send controller being the conventional circuit shown in FIG. 8 and connected to this retry sending controller is reset. When an empty field has been found out, data in an amount to be afforded by the data timing signal is read out of the message buffer 47 with the header information added thereto, whereby a packet is formed and is sent again.

Thus, by limiting the mates, communications with any desired mates are permitted using the limited number of message buffers, and besides, the node having sent an unreceived packet is permitted to communicate by sending the packet again after a certain time.

FIG. 7 is a detailed block diagram of the node shown in FIG. 3. In this node, the receive mate limiter shown in FIG. 1 and the send controller shown in FIG. 2 as explained before are set up as a receive mate limiter 108 and a send controller 119, and time-divided frames are circulated to switch packets.

The frame coming from the upper stream of the loop is received from a transmission line 127 into a receiver 101, and serial data is converted into parallel data in byte unit by a shift register 102. The pattern of a synchronous pattern generator 103 and the frame converted in byte unit are compared by a comparator 104. When the former matches with the synchronous pattern written in the synchronization field located at the head of the frame, a timing generation counter 105 is reset, whereby the node and the frame are synchronized. Then, various timing signals corresponding to the passing fields of the frame (LA timing 207, CTL timing 214, flag timing 208, SA timing 9, DA timing 213 and data timing 8) are produced from the timing generation counter 105.

Usually, the frame after the conversion in byte unit passes through a selector 114, a flag changer 124 and a selector 126 and is serialized again by a shift register 115, whereupon it is delivered to a transmission line 128 by a sender 116 so as to flow toward the lower stream of the loop.

While the frame is passing through the node, an address check for checking if the frame is destined for the own node, a reception operation, and such operations as field occupation and packet sending are carried out as may be needed.

In the address check, the frame data being the output of the shift register 102 and the value of a node address register 106 previously set are compared by a comparator 107 in accordance with the DA timing 213 provided from the timing generation counter 105. In a case where they match, the packet is destined for the own node, and hence, the receive mate limiter 108 is instructed to start the reception operation. At the same time, in a frame check sequence checker (FCS check) 129, an FCS calculation is executed to check an error. In addition, the CTL information is derived from the frame data in accordance with the CTL timing 214, and it is analyzed and delivered to the receive mate limiter 108 by a CTL analyzer 109.

In the receive mate limiter 108, addresses are compared by the plurality of prepared comparators 2 when it is known from the SA timing 9 that the sender address (SA) has arrived in the packet appearing on the receive data bus 1 shown in FIG. 1. Match/mismatch are conveyed from the respective comparators 2 to the gate 6, which gives the selector 7 a result to that effect only when quite no match has been obtained. The selector 7 selects the buffer as to which the corresponding one of the flag registers 4 disposed for the respective buffers indicates empty. Assuming here that the channel of message buffer "1" has been selected, the flag register 4 is set, and the "sender address" appearing on the receive data bus 1 is gathered in the address register 3. Thus, a match signal is provided from the comparator 2 to set the latch 13. Thenceforth, since the gate 12 is enabled at the data timing, the data part which corresponds to the single packet appearing on the receive data bus is gathered in the message buffer "1."

Subsequently, in the arrangement of FIG. 7, the checked result of the frame check sequence (FCS) checker 129 at the time of reception is put in an LA pattern generator 110. Here, an LA pattern to be returned is determined from the checked result and LA information from the receive mate limiter 108, and it is substituted for the older LA from the shift register 102 in the selector 114 at the LA timing. Thereafter, the frame is serialized by the shift register 115 and is sent from the sender 116 to the transmission line 128.

Next, when the second packet from the same sender has arrived, the sender address (SA) similarly appears on the receive data bus 1 shown in FIG. 1. Since, however, the same address has already been registered in the address register 3, the match signal is provided from the comparator 2, and the latch 13 is set, so that data is gathered in the message buffer "1" at the data timing.

In a case where the last packet of the message from the same sender has arrived, the CTL analyzer 109 in FIG. 7 analyzes the CTL information in the packet format and delivers it to the comparator 17 in FIG. 1, included in the receive mate limiter 108. When the CTL information is compared with the end pattern 16 to match therewith, the gate 15 gives the host computer 'completion of buffer "1" message processing' indication via a host computer interface 113 in FIG. 7. In accordance with the indication, the host computer reads out the message within the message buffer "1" via the host computer interface 113. Thereafter, when the host computer provides 'end of buffer "1" readout' indication via the host computer interface 113, the flag register 4 is reset, and the message buffer "1" becomes empty again and usable for another message.

In a sending operation, the host computer prepares a message to-be-sent in a send buffer 120 in FIG. 7 via the host computer interface 113 and sets a send request register 118.

Using a reader 121, the send controller 119 gathers the message into the message buffer 47 shown in FIG. 8, included in this send buffer 119, and sets the length thereof in the message length register 44. Since the send request register 118 has been set, the latch 38 is set by the gate 37 so as to start the action of field occupation. More specifically, when an empty detector 117 in FIG. 7 detects the arrival of a frame the 'busy/empty' indication of which denotes empty, the gate 39 in FIG. 2 is enabled to send a 'flag change occupation' signal. Upon receiving this signal, the flag changer 124 in FIG. 7 changes the empty indication to the busy indication.

Thereafter, header information is sent from the header information producing circuit 42 onto the send data bus 41 through the selector 40 in accordance with the DA timing, SA timing and CTL timing. At the data timing, the counter 43 is started, while an address is generated by the reader 46, whereby data is read out every byte from the message buffer 47. The data is similarly delivered to the send data bus 41 through the selector 40. Thereafter, the header information and data delivered are sent to the selector 126 in FIG. 7. On that occasion, FCS information is computed by an FCS producing circuit 125 and is also sent to the selector 126. Thereafter, the information items are delivered to the transmission line 128 via the shift register 115 as well as the sender 116.

The quantity of data which can be sent at one time depends upon the size of the packet field on the frame, and the data timing signal with a length corresponding to the size is provided to indicate the quantity. Accordingly, in a case where the message to be sent is longer than the data length of a packet, it is sent from the message buffer 47 in FIG. 8 dividedly a plurality of times. When it is decided by the comparator 45 that a value indicated by the counter 43 has become equal to the value indicated in the message length register 44, the latch 38 is reset to disable the gate 39, and subsequent fields are not occupied.

When the sent packet has come back, that is, when the data from the shift register 102 and the set value of the node address register 106 have been found to match by a comparator 122 at the SA timing from the timing generation counter 105 in FIG. 7, the LA value is read out by an LA pattern reader 123, and whether or not it is the LA receive not-ready pattern is checked by the comparator 33 in FIG. 2. When the LA value is unreceivable, the buffers within the receiving node are regarded as being fully occupied, and the packet is sent again after a certain fixed time. More specifically, the latch 38 is reset by a match signal from the comparator 33 so as to interrupt the sending. In addition, the timer 34 is reset. When reset, the timer 34 starts counting from "0." When the content of the timer has become equal to a value set in the wait time register 35, a match signal is provided from the comparator 36, and the sending controller operates as if the send request were issued from the gate 37 for the first time. Thus, the counter 43 in FIG. 8 is reset, so that the message can be sent from the head thereof. Subsequently, the latch 38 is set, and the resending is started when an empty field has been detected.

As described above, the receive mate limiter is incorporated, and the send controller is additionally endowed with the retry sending function, whereby the limited small number of message buffers for reassembling messages may be prepared in spite of the fact that the buffers must be, in essence, prepared in the number of all the receive mate nodes, and when messages in excess of the prepared buffers have concentrated on any of the nodes, the messages not received are relieved by the operations of the retry sending functions on the sending sides, so that the communications can be maintained.

As a general example, in LAN's represented by token ring LAN or the like, the maximum message length which can be handled is becoming 8 Kbytes or so, and the maximum node number of a loop network is usually 128. In this case, to the end of making it possible to receive packets from all nodes and to reassemble messages in conformity with the prior-art system, buffers having as large a capacity as 128 nodes $\times 8$ Kbytes$\approx 1$ Mbyte must be disposed in each of all the nodes for only the purpose of reassembling the messages. However, reductions in size and price are increasingly required of the nodes which are changing from the stationary type to the work station assemblage type, and it is unpractical to install the buffers of such a large capacity merely for the aforementioned purpose.

By applying the embodiments, it suffices to prepare the smallest amount of buffers corresponding to the rates of concentration of communications on each node, the traffic, and the processing ability. Although the required amount of buffers differs depending also upon the above conditions, it will be several hundredths of that of the prior art if the concept of the Erlang distribution which is used for calculating the optimum number of circuits in an exchange is applied to the present invention.

Moreover, owing to the simple logic of restricting the receive mates, the invention can be realized without the necessity for complicatedly controlling the usage of the limited number of buffers.

The reassembly processing of messages is indispensable to the mini-packet system which is in the limelight as one scheme for realizing the higher speed and larger capacity of the LAN. Therefore, the sharp curtailment of the buffer capacity according to the embodiments is also effective for the realization of ultrahigh-speed LAN in the future.

As described above, according to the present invention, each node need not include buffers in the number of all mate nodes, and a limited number of buffers suffice for keeping communications. Therefore, wasteful buffers need not be installed, so that the hardware volume of each node is small to attain economization.

We claim:

1. A message transfer system wherein messages are transferred between at least two nodes on a transmission loop by segmenting each of the messages into a plurality of packets, said system comprising:
   storage means for registering a code that identifies the sender address from which messages are to be received;
   message buffer means for receiving and reassembling the message from the received packets;
   means for controlling the arrival of said packets at said message buffer means, in accordance with whether or not said packets correspond to the registered code which identifies the sender address.

2. A message transfer system as defined in claim 1, wherein said means for controlling further comprises:
   means to detect empty buffer fields when said received packet does not correspond to any of the registered codes in the storage means and to register said code which identifies the sender address of said received packet in said empty storage means.

3. A message transfer system as defined in claim 1, wherein said message buffer means comprises a plurality of message buffer fields, such that messages from the sender addresses equal in number to said message buffer fields can be simultaneously received and reassembled.

4. A message transfer system as defined in claim 2, further comprising means to return the packet to said sender address, when said sender address does not correspond to any of the registered codes and no storage means are available.

5. A message transfer system as defined in claim 4, further comprising means to retransmit said returned packet after a predetermined period of time.

6. In a message transfer system wherein messages are transferred between at least two nodes on a transmission loop by segmenting each of the messages into a plurality of packets, a message transfer method comprising the steps of:
   storing a code for identifying the sender address from which messages are to be received;
   controlling the arrival of said packets in accordance with whether or not said packets correspond to the registered code which identifies the sender address; and
   receiving and reassembling the message from the packets.

7. A communication network system having a plurality of nodes connected to at least a transmission path and at least a processing device which is to be a source or a destination of a message, each of said nodes comprising:
   means for dividing a message received from said processing device into packets and sending out to said transmission path, each of said packets having a code which identifies the sender address and the destination address;
   buffer means comprising a plurality of buffer fields for storing received packets sent from other nodes over said path;
   first memory means for indicating the availability of buffer fields;
   second memory means for storing said code which identifies the sender address of a received packet; and
   control means for controlling the arrival of said packets, in accordance with whether or not said code which identifies the sender address of said packet corresponds with said code stored in said second memory means, when said code for identifying the sender address of said received packet does not correspond to said code stored in said second memory means and said first memory means indicates an empty buffer field, storing said code for identifying the sender address of the received packet in said empty buffer field.

8. A communication network system according to claim 7, wherein, each node further comprises:
   means for indicating to the sender address that the node is not ready to receive when said control means determines that the sender address of the received packet does not correspond to the register code and no empty buffer field is available.

* * * * *